United States Patent
Rotstein et al.

(10) Patent No.: US 12,328,324 B2
(45) Date of Patent: Jun. 10, 2025

(54) SYSTEM FOR DETECTING LATERAL MOVEMENT COMPUTING ATTACKS

(71) Applicant: Microsoft Technology Licensing, LLC, Redmond, WA (US)

(72) Inventors: Tomer Rotstein, Haifa (IL); Eran Shany, Haifa (IL)

(73) Assignee: Microsoft Technology Licensing, LLC, Redmond, WA (US)

(*) Notice: Subject to any disclaimer, the term of this patent is extended or adjusted under 35 U.S.C. 154(b) by 175 days.

(21) Appl. No.: 18/081,641

(22) Filed: Dec. 14, 2022

(65) Prior Publication Data

US 2024/0121249 A1    Apr. 11, 2024

Related U.S. Application Data

(60) Provisional application No. 63/414,243, filed on Oct. 7, 2022.

(51) Int. Cl.
  *H04L 29/06* (2006.01)
  *H04L 9/40* (2022.01)

(52) U.S. Cl.
  CPC ...... *H04L 63/1416* (2013.01); *H04L 63/1425* (2013.01); *H04L 63/20* (2013.01)

(58) Field of Classification Search
  None
  See application file for complete search history.

(56) References Cited

U.S. PATENT DOCUMENTS

| | | | |
|---|---|---|---|
| 10,404,729 B2* | 9/2019 | Turgeman | G06F 21/31 |
| 10,454,950 B1 | 10/2019 | Aziz | |
| 10,462,169 B2 | 10/2019 | Joseph Durairaj et al. | |
| 10,887,333 B1* | 1/2021 | Pereira | G06F 21/55 |
| 11,146,472 B1 | 10/2021 | Sinks et al. | |
| 11,146,575 B2* | 10/2021 | Higbee | H04L 51/212 |
| 11,392,691 B1* | 7/2022 | Wright | H04L 63/145 |
| 11,399,039 B2 | 7/2022 | Rubin et al. | |
| 11,552,975 B1* | 1/2023 | Zhang | H04L 63/08 |
| 11,677,791 B1* | 6/2023 | Dunkel | H04L 63/205 726/1 |
| 11,770,388 B1* | 9/2023 | Laconic | H04L 67/12 726/23 |
| 11,777,992 B1* | 10/2023 | Cross | H04L 63/0876 726/5 |

(Continued)

OTHER PUBLICATIONS

Shahriar, Hossain et al. Android malware detection using permission analysis. SoutheastCon 2017. https://ieeexplore.ieee.org/stamp/stamp.jsp?tp=&arnumber=7925347 (Year: 2017).*

(Continued)

*Primary Examiner* — Jeremiah L Avery
(74) *Attorney, Agent, or Firm* — Schwegman Lundberg & Woessner, P.A.

(57) ABSTRACT

A method may include receiving from a first computing device, metadata that includes a suspected malicious activity indicator and a device identifier associated with the indicator; receiving, from a second computing device, log activity data; matching the device identifier included in the metadata to a device identifier in the log activity data; and based on the matching, transmitting an alert identifying the second computing device as a source of the suspected malicious activity.

16 Claims, 5 Drawing Sheets

(56) References Cited

U.S. PATENT DOCUMENTS

| | | | |
|---|---|---|---|
| 11,936,685 B2* | 3/2024 | Seletskiy | H04L 63/145 |
| 12,034,740 B1* | 7/2024 | Carmack | H04L 63/1416 |
| 12,058,157 B1* | 8/2024 | Colon | H04L 63/1425 |
| 2012/0017275 A1* | 1/2012 | Harmonen | G06F 21/56 726/24 |
| 2014/0380478 A1 | 12/2014 | Canning | |
| 2016/0044054 A1* | 2/2016 | Stiansen | H04L 63/1416 726/24 |
| 2018/0027006 A1* | 1/2018 | Zimmermann | H04L 63/0227 726/11 |
| 2019/0318100 A1* | 10/2019 | Bhatia | G06F 21/57 |
| 2020/0137125 A1* | 4/2020 | Patnala | H04L 63/302 |
| 2020/0204574 A1* | 6/2020 | Christian | G06F 18/23 |
| 2020/0213359 A1* | 7/2020 | Arbel | H04L 63/20 |
| 2020/0228565 A1* | 7/2020 | Reverte | H04L 43/16 |
| 2021/0021612 A1* | 1/2021 | Higbee | H04L 63/1416 |
| 2022/0103593 A1* | 3/2022 | Singh | H04L 63/0245 |
| 2022/0232024 A1* | 7/2022 | Kapoor | G06F 21/57 |
| 2022/0232025 A1* | 7/2022 | Kapoor | H04L 63/1425 |
| 2022/0272116 A1* | 8/2022 | Li | G16Y 10/75 |
| 2022/0368699 A1* | 11/2022 | Thomson | H04L 63/1483 |
| 2022/0400130 A1* | 12/2022 | Kapoor | H04L 63/10 |
| 2023/0083949 A1* | 3/2023 | Mutolo | H04L 63/14 726/23 |
| 2023/0131988 A1* | 4/2023 | Thomson | H04L 63/1433 726/15 |
| 2023/0133892 A1* | 5/2023 | Kohout | H04L 63/1425 726/23 |
| 2023/0156030 A1* | 5/2023 | Bassi | H04L 63/1408 726/25 |
| 2023/0171266 A1* | 6/2023 | Brunner | H04L 41/16 726/23 |
| 2023/0231860 A1* | 7/2023 | Tian | G06N 5/022 726/1 |
| 2023/0239325 A1* | 7/2023 | Keiser, Jr. | H04L 63/1416 726/1 |
| 2023/0300114 A1* | 9/2023 | Bhallamudi | H04L 63/10 726/6 |
| 2023/0328086 A1* | 10/2023 | Kapoor | H04L 63/1425 |
| 2023/0336575 A1* | 10/2023 | Ackerman | H04L 63/1425 |
| 2023/0379350 A1* | 11/2023 | Barton | H04L 63/1416 |
| 2023/0412616 A1* | 12/2023 | Goldstein | H04L 63/1416 |
| 2024/0015176 A1* | 1/2024 | Egbert | H04L 63/1416 |
| 2024/0039951 A1* | 2/2024 | Jia | H04L 63/145 |
| 2024/0039952 A1* | 2/2024 | Jia | H04L 63/0236 |

OTHER PUBLICATIONS

Azodi, Amir et al. Towards Better Attack Path Visualizations Based on Deep Normalization of Host/Network IDS Alerts. 2016 IEEE 30th International Conference on Advanced Information Networking and Applications (AINA). https://ieeexplore.ieee.org/stamp/stamp.jsp?tp=&arnumber=7474208 (Year: 2016).*

International Search Report and Written Opinion received for PCT Application No. PCT/US2023/032567, Dec. 12, 2023, 12 pages.

"[MS-TDS]: Tabular Data Stream Protocol", Retrieved From: https://learn.microsoft.com/en-us/openspecs/windows_protocols/ms-tds/b46a581a-39de-4745-b076-ec4dbb7d13ec, Nov. 1, 2022, 226 Pages.

Assaf, et al., "Extended Events Overview", Retrieved From: https://learn.microsoft.com/en-us/sql/relational-databases/extended-events/extended-events?view=sql-server-ver16, Nov. 19, 2022, 7 Pages.

Bhasin, et al., "Data Center Application Security: Lateral Movement Detection of Malware using Behavioral Models", In Journal of SMU Data Science Review vol. 1, Issue 2, Jul. 20, 2018, 17 Pages.

Fawaz, et al., "Lateral movement detection using distributed data fusion", In Proceedings of IEEE 35th Symposium on Reliable Distributed Systems (SRDS), Sep. 26, 2016, pp. 21-30.

Jenks, et al., "Open Specification Promise", Retrieved From: https://learn.microsoft.com/en-us/openspecs/dev_center/ms-devcentlp/1c24c7c8-28b0-4ce1-a47d-95fe1ff504bc, Oct. 11, 2022, 15 Pages.

Liu, et al., "Latte: Large-scale lateral movement detection", In Proceedings of IEEE Military Communications Conference, Oct. 29, 2018, 8 Pages.

International Preliminary Report on Patentability received for PCT Application No. PCT/US23/032567, Apr. 17, 2025, 09 pages.

* cited by examiner

SYSTEM FOR DETECTING LATERAL MOVEMENT COMPUTING ATTACKS

RELATED APPLICATIONS

This patent application claims the benefit of priority, under 35 U.S.C. § 119(e), to U.S. Provisional Patent Application Ser. No. 63/414,243, titled "SYSTEM FOR DETECTING LATERAL MOVEMENT COMPUTING ATTACKS," filed on Oct. 7, 2022, which is incorporated by reference in its entirety

BACKGROUND

Enterprise computing networks are protected from malicious actors in several ways. For example, each managed computing device in the network may have a protection process (e.g., software) that monitors for attempted attacks, viruses, etc. Some managed computing devices may have limited network access (e.g., not directly accessible from a wider network such as the Internet) to prevent direct attacks.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawing.

DETAILED DESCRIPTION

Figure 1:
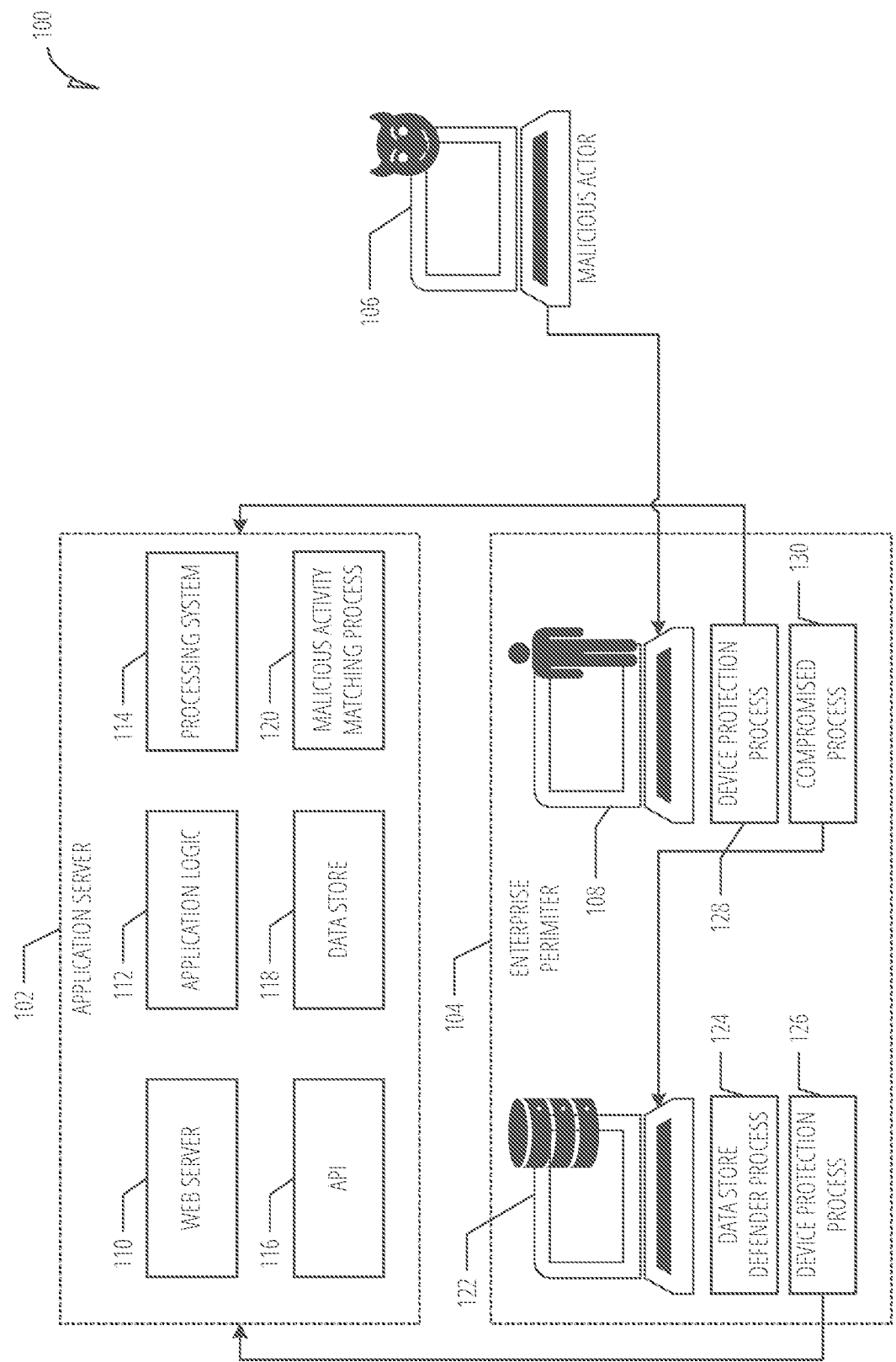
FIG. 1 illustrates a computer network environment, according to various examples.

In complex organization network infrastructures, network-based attacks do not necessarily originate from outside the organization's internal-network perimeter. For example, once one device is breached, it is used as a jump start to hop into additional resources (e.g., devices, processes) inside the organization using lateral movement attacks. In a lateral movement attack, many machine resources may be used. In such a scenario, identifying all the used resources can be a hard and lengthy process. Moreover, there could be more of those resources added at any time. To address the vulnerability and mitigate the breach, identifying and isolating the compromised user identity may be paramount.

As indicated above, there are often many levels and types of protection implemented for an enterprise network. For example, one type of protection may be a data store defender process that is installed on a device that manages storage requests, such as structured query language (SQL) commands. The data store defender process may issue alerts to security users upon suspicious database activities, potential vulnerabilities, and SQL injection attacks, as well as anomalous database access and queries patterns. In various examples, the alerts may be transmitted to a server-based protection system and include details of the suspicious activity and recommend action on how to investigate and mitigate the threat.

One aspect of a data store defender process is enriching any issued alerts with additional information that can improve a security officer's understanding of the alert (e.g., by providing recommendations and documentation) and help them successfully resolve the situation (e.g., by providing actionable mitigation steps). One limitation of the alert is that it may not possess all the information that can be relevant to the alert. For example, an alert might contain information of the attacker's origin, based on the information gathered from the network wire, as recorded by an SQL Server. This information is limited by a machine-to-machine communication channel, and protocol rules (e.g., the Tabular Data Store (TDS) protocol) upon which data is often encrypted.

The alert information may be transmitted to a resource administrator or chief information security officer (CISO), who may oversee multiple resources. When the alert indicates the attacker origin is coming from within the organization, requiring identifying an insider malicious access, the security officer may look for the origin machine owner and starts an investigation process to finding the root cause.

The process of identifying the root cause is difficult without complete information. For example, identifying the machine does not provide the actual person that initiated the access. There are countless applications running on the machine, and it is often impossible to determine the origin of the access and provide proper mitigation. The downside of this is delayed mitigation of the alert (which is vital in data breach situation) and unnecessary lost time and effort. Moreover, sometimes the alert is not fully being investigated, or the machine needs to be taken off the network entirely.

Separate front a product-type specific defender process such as a data store defender process, a more generalized device protection process may be installed on devices managed by the enterprise. The device protection process may employ sensors to collect and process behavioral signals from the operating system and send this sensor data to a private, isolated, instance of the server-based protection system. The server-based protection system may leverage data analytics, device learning, and online assets to take the behavioral signals and translate them into insights, detections, and recommended responses to advanced threats.

The systems and methods described herein provide a solution that combines multiple protection products to automatically quickly and accurately identify the root cause of a malicious command so that the proper mitigation steps may be implemented. The data store defender process may monitor an SQL Server of an enterprise and detect malicious activity. Information of the activity may contain the origin IP address, application name, hostname, process id and port that requested the command that triggered the detection. As discussed above, a device protection process may run on each of the enterprise devices and monitors each device for malicious activity (however unaware of the SQL attack surface) and collects information on process creation and execution activities.

In brief, the alerts from the data store defender process may be being shared with the device protection process, which is then transmitted to the server-based protection system. Based on the client IP, host name, process id and port, the server-based protection system analyzes the information collected from the origin machine and concludes the identity that performed the malicious access at the relevant time. This information leads to identifying the compromised user identity, assists with the investigation, and prevents future attacks by isolating the user identity.

The advantage of this approach is providing an ability to not only identify a compromised machine, but also to detect a compromised identity, bringing a much powerful security capability. Additionally, it helps shorten the mitigation time and effort for the alert, thus enhancing security, improving user experience, and preventing alert churn.

In the following description, for purposes of explanation, numerous specific details are set forth to provide a thorough understanding of some example embodiments. It will be evident, however, to one skilled in the art that the present invention may be practiced without these specific details.

Throughout this disclosure, electronic actions may be performed by components in response to different variable values (e.g., thresholds, user preferences, etc.). As a matter of convenience, this disclosure does not always detail where the variables are stored or how they are retrieved. In such instances, it may be assumed that the variables are stored on a storage device (e.g., Random Access Memory (RAM), cache, hard drive) accessible by the component via an Application Programming Interface (API) or other program communication method. Similarly, the variables may be assumed to have default values should a specific value not be described. User interfaces may be provided for an end-user or administrator to edit the variable values in some instances.

In various examples described herein, user interfaces may be described as presented to a computing device. Presentation may include data transmitted (e.g., a hypertext markup language file) from a first device (such as a web server) to the computing device for rendering on a display device of the computing device via a web browser. Presenting may separately (or in addition to the previous data transmission) include an application (e.g., a stand-alone application) on the computing device generating and rendering the user interface on a display device of the computing device without receiving data from a server.

FIG. 1 illustrates a computer network environment, according to various examples. The illustration comprises an application server 102, an enterprise perimeter 104, an attacking computing device 106, a user computing device 108, a web server 110, an application logic 112, a processing system 114, an API 116, a data store 118, a malicious activity matching process 120, an infrastructure computing device 122, a data store defender process 124, a device protection process 126, a device protection process 128, and a compromised process 130.

Application server 102 may be a server-based protection system that provides services to one or more user groups. A user group may be an enterprise, for example. In the context of FIG. 1, an enterprise is depicted with only two devices within enterprise perimeter 104 for discussion purposes; however, an enterprise may include tens of thousands of managed devices.

Application server 102 is illustrated as set of six separate elements, but the functionality of multiple, individual elements may be performed by a single element. An element may represent computer program code that is executable by processing system 114. The program code may be stored on a storage device (e.g., data store 118) and loaded into a memory of the processing system 114 for execution. Portions of the program code may be executed in a parallel across multiple processing units (e.g., a core of a general-purpose computer processor, a graphical processing unit, an application specific integrated circuit, etc.) of processing system 114. Execution of the code may be performed on a single device or distributed across multiple devices. In some examples, the program code may be executed on a cloud platform (e.g., MICROSOFT AZURE® and AMAZON EC2®) using shared computing infrastructure.

User computing device 108, attacking computing device 106, and infrastructure computing device 122 may be, but are not limited to, a smartphone, tablet, laptop, multiprocessor system, microprocessor-based or programmable consumer electronics, game console, set-top box, or another device that a user utilizes to communicate over a network. In various examples, a computing device includes a display module (not shown) to display information (e.g., in the form of specially configured user interfaces). In some embodiments, computing devices may comprise one or more of a touch screen, camera, keyboard, microphone, or Global Positioning System (GPS) device.

User computing device 108, attacking computing device 106, infrastructure computing device 122, and application server 102 may communicate via a network (not shown). The network may include local-area networks (LAN), wide-area networks (WAN), wireless networks (e.g., 802.11 or cellular network), the Public Switched Telephone Network (PSTN) Network, ad hoc networks, cellular, personal area networks or peer-to-peer (e.g., Bluetooth®, Wi-Fi Direct), or other combinations or permutations of network protocols and network types. The network may include a single Local Area Network (LAN) or Wide-Area Network (WAN), or combinations of LAN's or WAN's, such as the Internet.

In various examples, enterprise perimeter 104 may represent the extent of an internal network (e.g., an intranet) for an enterprise. Thus, certain communication paths may be available to devices connected to the internal network that are not accessible to devices outside the perimeter. For example, user computing device 108 may issue commands to infrastructure computing device 122 but attacking computing device 106 may not be able to directly access infrastructure computing device 122. In other examples, the commands may be made attempted by attacking computing device 106 (e.g., there is no network restriction), but without proper authorization credentials, would not succeed.

In some examples, communications between devices may occur using an application programming interface (API) such as API 116. An API provides a method for computing processes to exchange data. A web-based API (e.g., API 116) may permit communications between two or more computing devices infrastructure computing device 122 and application server 102, or user computing device 108 and infrastructure computing device 122. The API may define a set of HTTP calls according to Representational State Transfer (RESTful) practices. For examples, A RESTful API may define various GET, PUT, POST, DELETE methods to create, replace, update, and delete data stored in a database (e.g., data store 118). The data may include log activity data or suspected malicious activity report data, in various examples. Individual computing devices may have their own APIs as well. For example, infrastructure computing device 122 may include an API to access or store data stored in an enterprise database, such as an SQL server.

Application server 102 may include web server 110 to enable data exchanges with infrastructure computing device 122 and user computing device 108. Although generally discussed in the context of delivering webpages via the Hypertext Transfer Protocol (HTTP), other network protocols may be utilized by web server 110 (e.g., File Transfer Protocol, Telnet, Secure Shell, etc.). A user may enter in a uniform resource identifier (URI) into a web client (e.g., the INTERNET EXPLORER® web browser by Microsoft Corporation or SAFARI® web browser by Apple Inc.) that corresponds to the logical location (e.g., an Internet Protocol address) of web server 110. In response, web server 110 may transmit a web page that is rendered on a display device of a client device (e.g., a mobile phone, desktop computer, etc.).

Additionally, web server 110 may enable a user to interact with one or more web applications provided in a transmitted web page. A web application may provide user interface (UI) components that are rendered on a display device of infrastructure computing device 122, user computing device 108, or other enterprise client device such as a device being used by a security officer. The user may interact (e.g., select, move, enter text into) with the UI components, and, based on the interaction, the web application may update one or more portions of the web page. A web application may be executed in whole, or in part, locally on a client device. The web application may populate the UI components with data from external sources or internal sources (e.g., data store 118) in various examples. For example, a web application may present a dashboard to a security officer of the alerts received by application server 102 and present mitigation strategies for the identified user of malicious activity matching process 120.

The web application may be executed according to application logic 112. Application logic 112 may use the various elements of application server 102 to implement the web application. For example, application logic 112 may issue API calls to retrieve or store data from data store 118 and transmit it for display on a client device. Similarly, data entered by a user into a UI component may be transmitted using API 116 back to the web server. Application logic 112 may use other elements (e.g., malicious activity matching process 120) of application server 102 to perform functionality associated with the web application as described further herein.

Data store 118 may store data that is used by application server 102. Data store 118 is depicted as singular element but may in actuality be multiple data stores. The specific storage layout and model used in by data store 118 may take several forms-indeed, a data store 118 may utilize multiple models. Data store 118 may be, but is not limited to, a relational database (e.g., SQL), non-relational database (NoSQL) a flat file database, object model, document details model, graph database, shared ledger (e.g., blockchain), or a file system hierarchy. Data store 118 may store data on one or more storage devices (e.g., a hard disk, random access memory (RAM), etc.). The storage devices may be in standalone arrays, part of one or more servers, and may be in one or more geographic areas.

As mentioned above, infrastructure computing device 122 may be a computing device that runs a data server, such as an SQL server. Both data store defender process 124 and device protection process 126 may be installed on infrastructure computing device 122. Reports issued from data store defender process 124 may be sent to device protection process 126 for transmitting to application server 102. In various examples, data store defender process 124 and device protection process 126 may each communicate reports and activity data separately to application server 102.

User computing device 108 may be a computing device of a user and have device protection process 128 installed. Log activity data (including process identifiers executing on user computing device 108) may be transmitted to application server 102 via device protection process 128.

Attacking computing device 106 represents a nefarious actor that has gained access to user computing device 108. For example, a virus may have surreptitiously installed by a user clicking a link in an email or the user of user computing device 108 may use the same login credentials on website that was hacked. As part of attacking computing device 106 being compromised, attacking computing device 106 may direct user computing device 108 to issue a command via compromised process 130 to infrastructure computing device 122.

Figure 2:
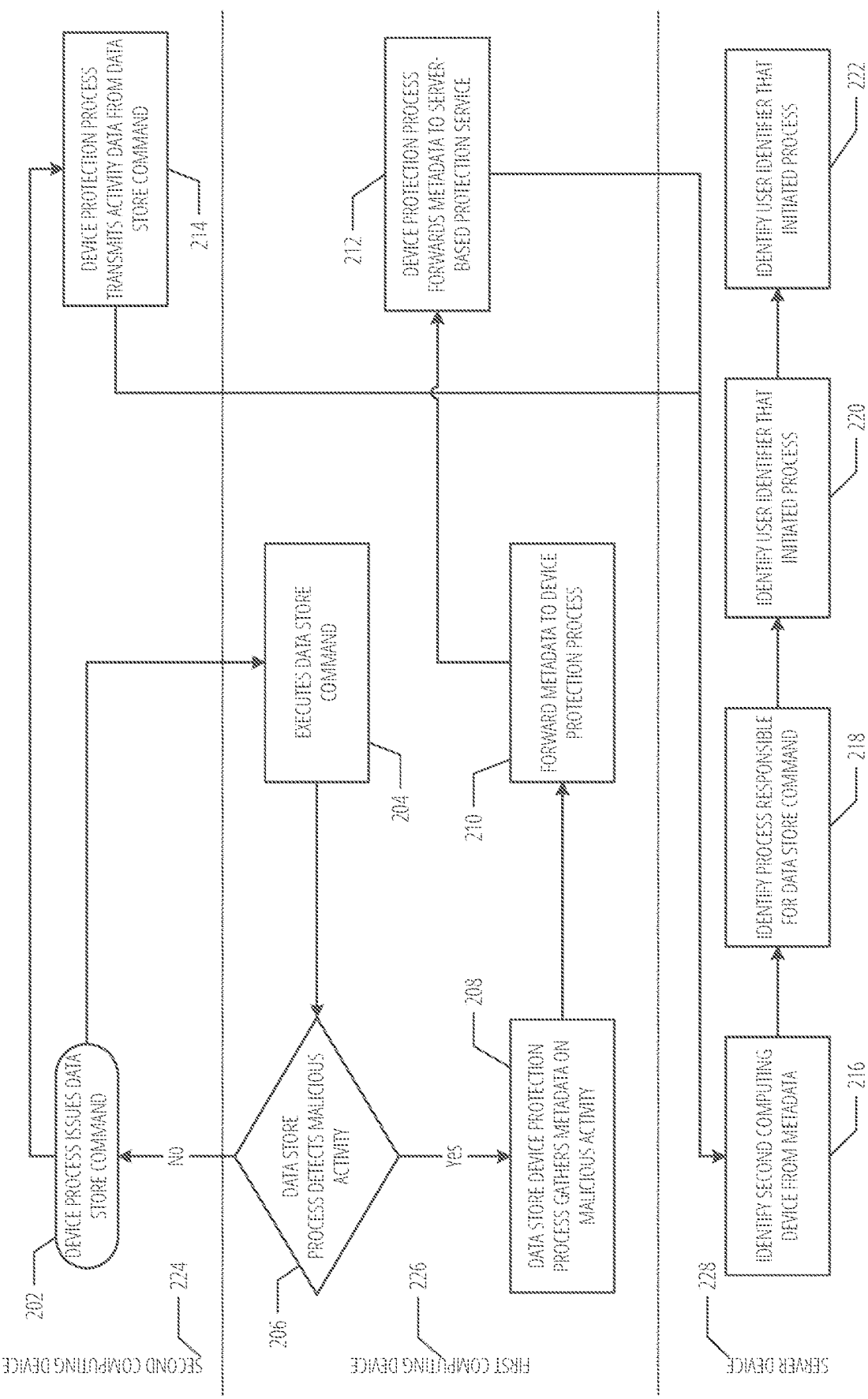
FIG. 2 illustrates a method flow of matching a command to a user identifier, according to various examples.

FIG. 2 illustrates a method flow of matching a command to a user identifier, according to various examples. The example illustrated uses a data store command, but the techniques for identifying a user are not limited to such commands. The method flow is organized into three rows according to the device that implements the operation. For example, second computing device 224 may be a user computer such as user computing device 108 that exists with an enterprise. First computing device 226 may be another device within the enterprise, such as infrastructure computing device 122. Server device 228 may be a computing device that provides protection services to enterprises such as application server 102.

The method may begin at operation 202 in which a process of second computing device 224 issues a data store command to second computing device 224. The command may originate from compromised process 130. The command be issued to an SQL server on first computing device 226. Additionally, a device protection process of second computing device may transmit activity data concerning the data store command to server device 228. For example, a timestamp and a process identifier of the process that requested the data store command may be included as part of the activity data.

At operation 204, first computing device 226 executes the data store command. For example, the data store command may be to retrieve certain data, delete certain data, etc.

At operation decision 206, a data store defender process of first computing device 226 may determine if the executed command should be classified as malicious. For example, data store defender process may be connected the SQL service and listen for events (e.g., commands). Heuristic measures may be calculated for the command—in isolation or as part of a series of commands received from second computing device 224—to determine if the command is outside the range of normal behavior for the second computing device 224. In other examples, the command may be input into a previously trained machine learning model. The machine learning model may output a probability that the data store command was malicious.

If the data store defender process indicates the command was not malicious, method flow reverts to operation 202. If the data store defender process indicates the command was likely made maliciously, control flows to operation 208. At operation 208, data store defender process gathers metadata about the command.

The metadata may include information extracted from the events monitored by the data store defender process. The information may be proprietary, in various examples. For example, a data store server process (e.g., an SQL server) may have the same developer as the data store defender process. Accordingly, the data store defender process may be able to access data that another process may not (e.g., because the information is proprietary and/or encrypted). The event details may include an application name, user-name, hashed password, originating hostname, originating IP address and port number, process id.

At operation 210, the data store defender process may forward the metadata on the malicious event to the device protection process. The device protection process may also be developed by the same developer as the SQL server and data store defender process, in various examples, as part of a protection suite of applications. The device protection process may be a client (e.g., agent) part of a server-based protection system (e.g., application server 102). In various examples, the device protection process may not otherwise be able to access the metadata without receiving it from the data store defender process. At operation 212, first computing device 226 via the device protection process transmits the metadata to server device 228.

Once server device 228 has the device protection process data from the second computing device 224 and metadata from the first computing device 226, a process of matching the data store command to a user may be performed. In various examples, the matching process is tiered such that first the second computing device 224 is identified, then a process running on the second computing device 224 is identified, and finally the user identifier associated with the process is identified-operations 216, 216, and operation 218, respectively. These operations are discussed in more detail with respect to FIG. 3

Figure 3:
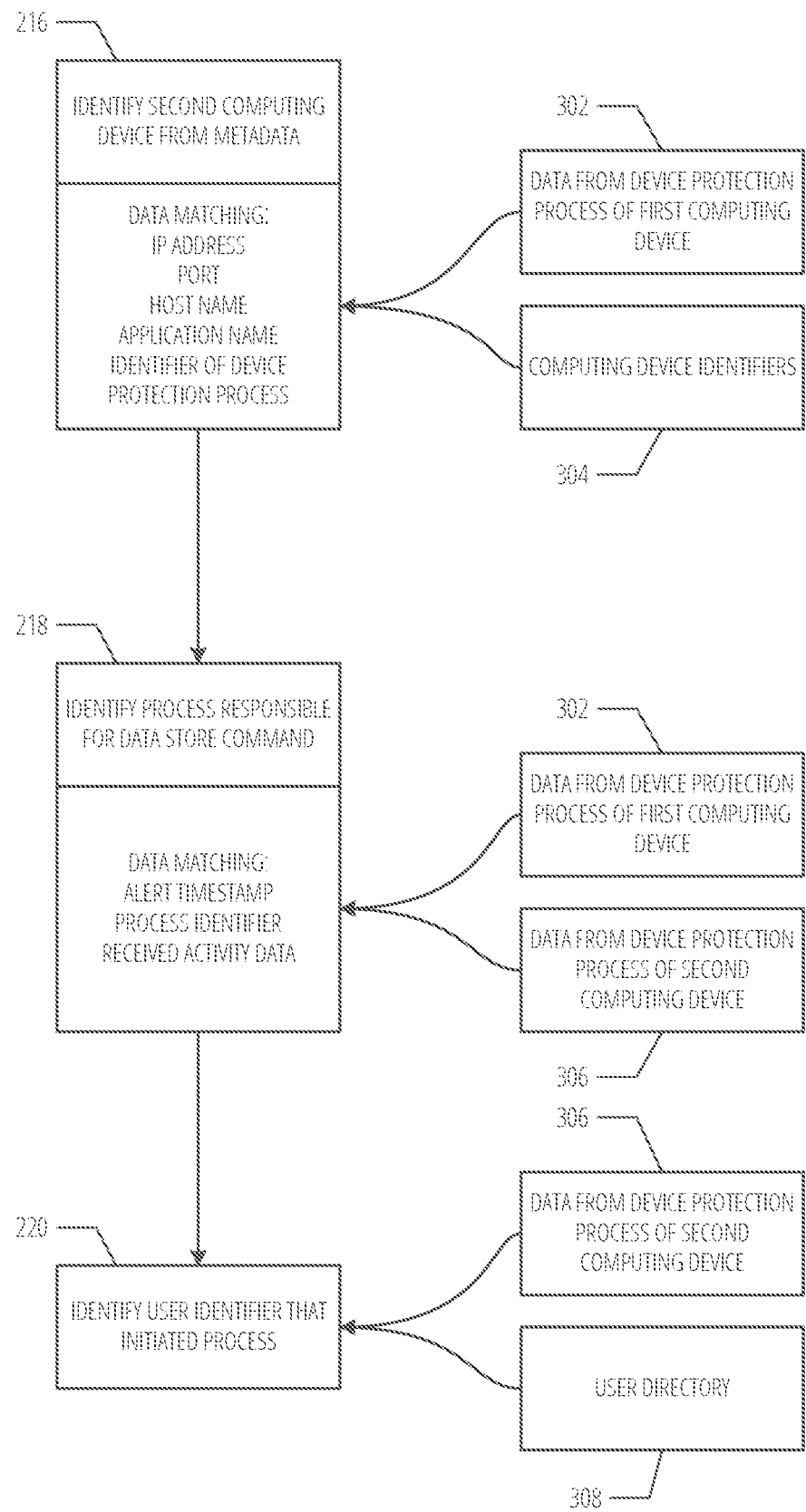
FIG. 3 illustrates operations to identify a user associated with an executed process, according to various examples.

FIG. 3 illustrates operations to identify a user associated with an executed process, according to various examples. FIG. 3 illustrates operation 216, operation 216, and operation 220. Next to each operation are example data sources that may be used to implement the operation. Additional or fewer data sources may be used in various examples.

At operation 216, data from device protection process of first computing device 302 and computing device identifiers 304 (e.g., a datastore of an enterprise managed computing devices and associated identifiers such as IP address) may be used to identify the second computing device. The data matching process may include a device identifier such as an IP Address, Port. Host name, application name, and/or an identifier of a device protection process to deduce the second computing device.

An operation 218, data from device protection process of first computing device 302 and data from device protection process of second computing device 306 may be used to deduce the exact processes that were running on the identified computing device match the exact process that initiated the activity (e.g., the malicious activity). For example, the alert timestamp, process id, and information collected from the originating machine (e.g., second computing device 224) may be matched to the timestamp, etc., of the received metadata from first computing device 226. Thus, if the timestamp of when the command that triggered the data store defender process to identify the command as potentially malicious matches the timestamp of the initiation of a process in the activity data, it may be assumed it was this process that is being used illicitly.

At operation 220, using data from device protection process of second computing device 306 and a user directory 308 (e.g., Active Directory® Software) the identity running the process and initiating the malicious activity may be identified. For example, the data from device protection process of second computing device 306 may include a user identifier that initiated the process.

With reference back to FIG. 2, and based on the user identifier, at operation 222 an alert may be issued and transmitted to one or more security administrators for the enterprise. The security administrators may mitigate the risk by taking several actions such as: contacting the identity owner (human employee) to investigate the activity and conclude whether it is malicious; verify whether a breach was made and a possibly identity exploitation/theft; potentially block the identity from performing additional activity; and further investigate additional activity performed by the identity owner (access to other resources, etc.).

Figure 4:
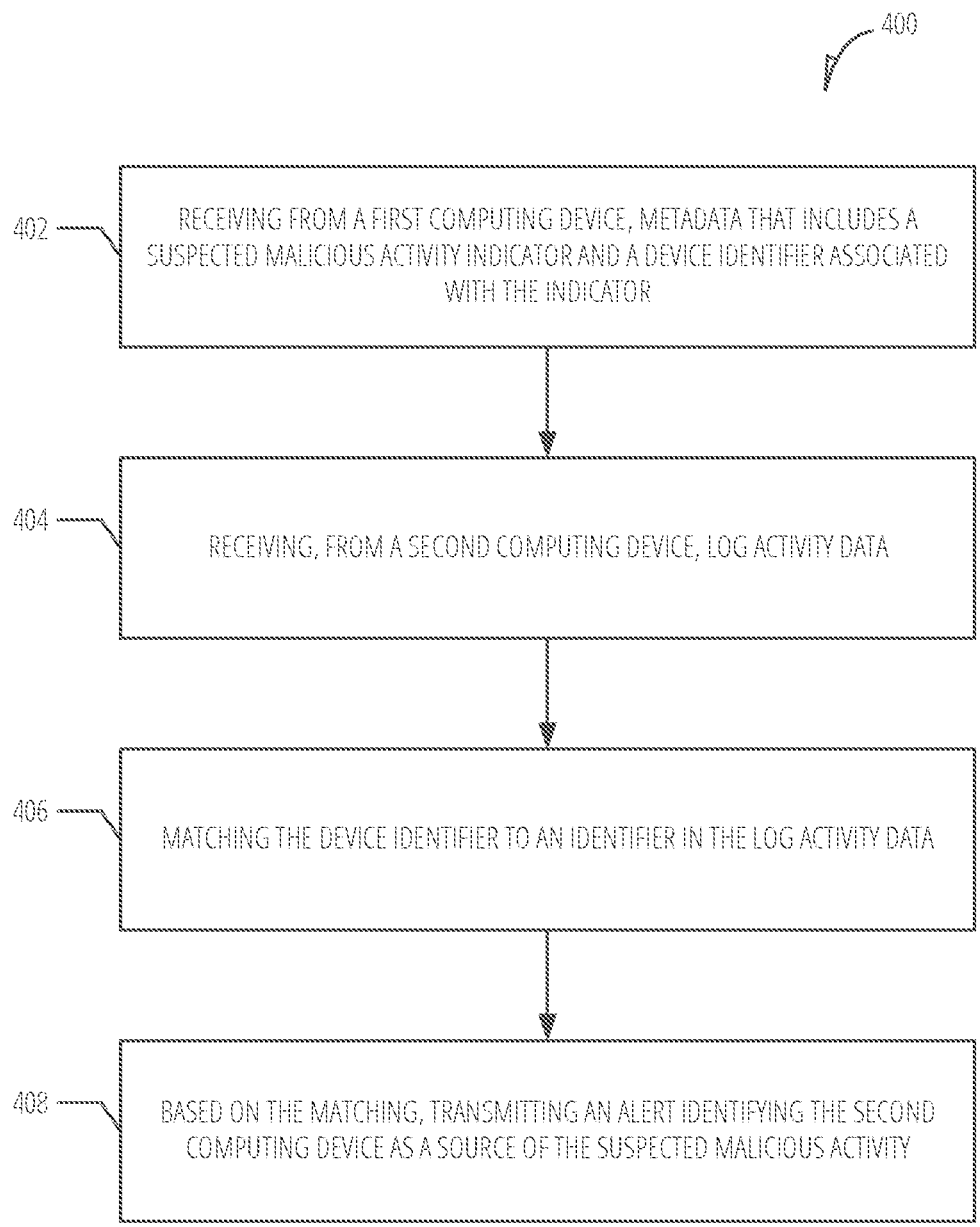
FIG. 4 is a flowchart illustrating a method to identify a user identifier associated with a malicious process, according to various examples.

FIG. 4 is a flowchart illustrating a method 400 to identify a user identifier associated with a malicious process, according to various examples. The method is represented as a set of blocks that describe operations 402 to 408 of the method. Method 400 may be embodied in a set of instructions stored in at least one computer-readable storage device of a computing device(s). A computer-readable storage device excludes transitory signals. In contrast, a signal-bearing medium may include such transitory signals. A machine-readable medium may be a computer-readable storage device or a signal-bearing medium. The computing device(s) may have one or more processors that execute the set of instructions to configure the one or more processors to perform the operations illustrated in FIG. 4. The one or more processors may instruct other component of the computing device(s) to carry out the set of instructions. For example, the computing device may instruct a network device to transmit data to another computing device or the computing device may provide data over a display interface to present a user interface. In some examples, performance of the method may be split across multiple computing devices using a shared computing infrastructure. In various examples, the method is performed using a server such as described with respect to application server 102.

At operation 402, in various examples, method 400 includes receiving from a first computing device, metadata that includes a suspected malicious activity indicator and a device identifier associated with the indicator. For example, the first computing device may be a device such as first computing device 226. The suspected malicious activity may be associated with a data store command executed on the first computing device. The metadata may include an internet protocol address of a device requesting the data store command. The metadata of suspected malicious activity detected on the first computing device may be received from a first type of protection process. For example, a data store defender process may collect and report the metadata to a server.

At operation 404, in various examples, method 400 includes receiving log activity data from a second computing device. The log activity data may originate from a second type of protection process such as a device protection process.

At operation 406, in various examples, method 400 includes matching the device identifier included in the metadata to a device identifier in the log activity data. For example, matching may include matching an internet protocol address of the second computing device to the internet protocol address included in the device identifier of the metadata (e.g., as discussed in operation 216).

Matching may include identifying a process identifier in the log activity data. Matching may also include matching a timestamp included in the metadata with an execution timestamp of the process and based on matching the timestamp, identifying the process identifier in the log activity data as a source of the suspected malicious activity (e.g., as discussed with respect to operation 218)

Additionally, matching may include accessing a user identifier associated with the process identifier in the log activity data (e.g., as discussed with respect to operation 220) and including the user identifier in the alert.

At operation 408, in various examples, method 400 includes based on the matching, transmitting an alert identifying the second computing device as a source of the suspected malicious activity.

Figure 5:
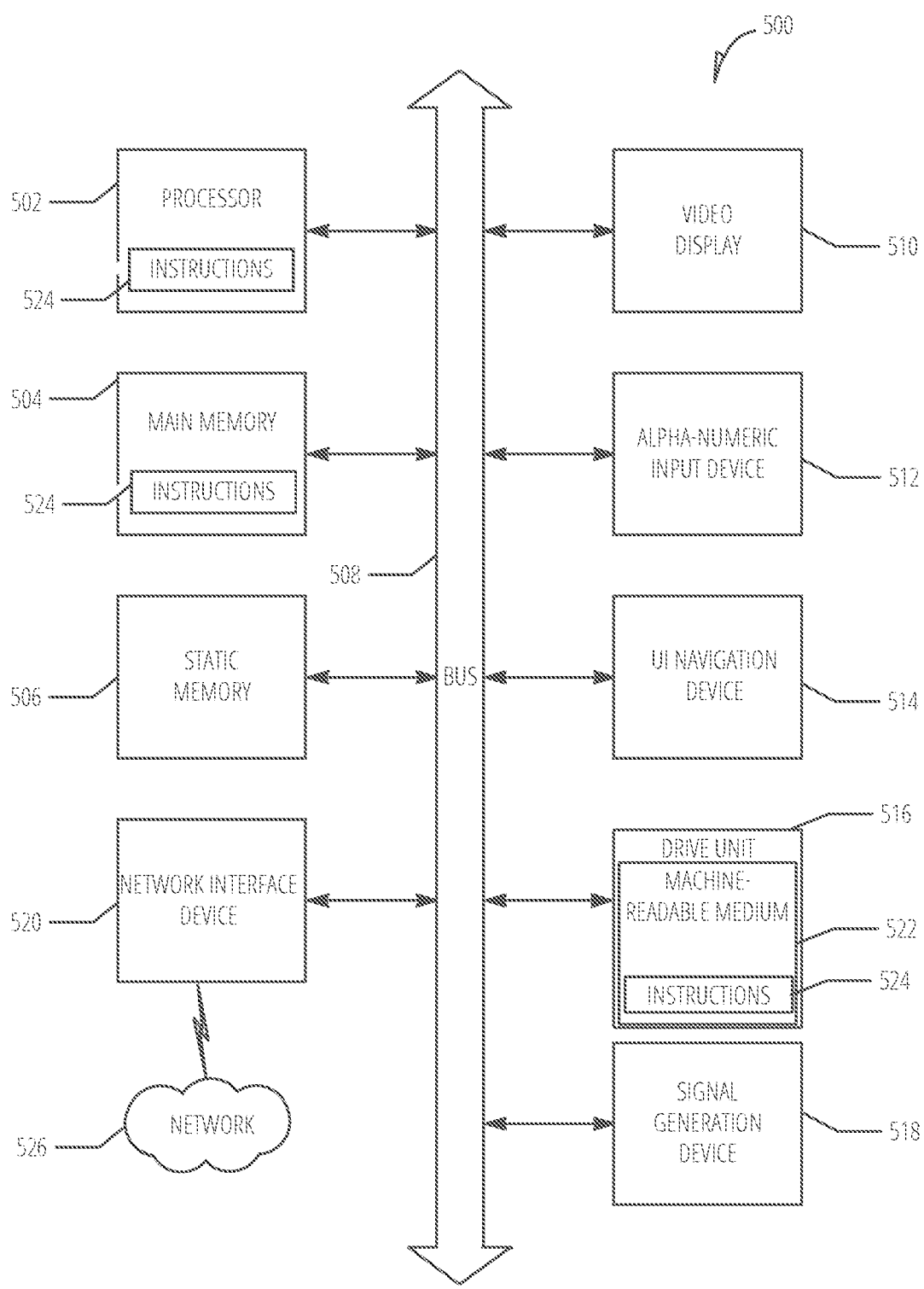
FIG. 5 is a block diagram illustrating a machine in the example form of computer system, within which a set or sequence of instructions may be executed to cause the machine to perform any one of the methodologies discussed herein, according to various examples.

FIG. 5 is a block diagram illustrating a machine in the example form of computer system 500, within which a set or sequence of instructions may be executed to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client Network environments, or it may act as a peer machine in peer-to-peer (or distributed) Network environments. The machine may be an onboard vehicle system, wearable device, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 500 includes at least one processor 502 (e.g., a central processing unit (CPU), a graphics processing unit (GPU) or both, processor cores, compute nodes, etc.), a main memory 504 and a static memory 506, which communicate with each other via a link 508. The computer system 500 may further include a video display unit 510, an input device 512 (e.g., a keyboard), and a user interface (UI) navigation device 514 (e.g., a mouse). In one embodiment, the video display unit 510, input device 512, and UI navigation device 514 are incorporated into a single device housing such as a touch screen display. The computer system 500 may additionally include a storage device 516 (e.g., a drive unit), a signal generation device 518 (e.g., a speaker), a network interface device 520, and one or more sensors (not shown), such as a global positioning system (GPS) sensor, compass, accelerometer, or other sensors.

The storage device 516 includes a machine-readable medium 522 on which is stored one or more sets of data structures and instructions 524 (e.g., software) embodying or utilized by any one or more of the methodologies or functions described herein. The instructions 524 may also reside, completely or at least partially, within the main memory 504, static memory 506, and/or within the processor 502 during execution thereof by the computer system 100, with the main memory 504, static memory 506, and the processor 502 also constituting machine-readable media.

While the machine-readable medium 522 is illustrated in an example embodiment to be a single medium, the term "machine-readable medium" may include a single medium or multiple media (e.g., a centralized or distributed Database, and/or associated caches and servers) that store the one or more instructions 524. The term "machine-readable medium" shall also be taken to include any tangible medium that is capable of storing, encoding, or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. A computer-readable storage device may be a machine-readable medium 522 that excluded transitory signals.

The instructions 524 may further be transmitted or received over a communications network 526 using a transmission medium via the network interface device 520 utilizing any one of several well-known transfer protocols (e.g., HTTP). Examples of communication networks include a local area Network (LAN), a wide area Network (WAN), the Internet, mobile telephone networks, plain old telephone (POTS) networks, and wireless data networks (e.g., Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein.

What is claimed is:

1. A system comprising:
a processing unit;
a storage device comprising instructions, which when executed by the processing unit, configure the system to perform operations comprising:
detecting execution of a malicious SQL command at an SQL server;
receiving metadata associated with the indicator associated with the detected malicious SQL command, the metadata comprising:
the malicious SQL command,
a device identifier of a first computing device,
a process identifier associated with the malicious SQL command, and
a timestamp of the malicious SQL command execution;
receiving, from a second computing device, log activity data comprising:

a device identifier of the second computing device,
a process identifier and associated execution timestamp for a process executed on the second computing device, and
a user identifier associated with the process identifier;
matching the device identifier of the first computing device to the device identifier of the second computing device;
matching the process identifier and timestamp from the metadata with the process identifier and associated execution timestamp from the log activity data;
accessing the user identifier associated with the matched process identifier; and
transmitting an alert identifying the second computing device as a source of the malicious SQL command, and the accessed user identifier.

2. The system of claim 1, wherein the operation of matching the device identifier included in the metadata to a device identifier in the log activity data includes:
matching an internet protocol address of the second computing device to the internet protocol address included in the device identifier of the metadata.

3. The system of claim 2, wherein the instructions, which when executed by the processing unit, configure the system to perform operations, further configure the system to perform operations of:
identifying a process identifier in the log activity data;
matching a timestamp included in the metadata with an execution timestamp of the process; and
based on matching the timestamp, identifying the process identifier in the log activity data as a source of the suspected malicious SQL command.

4. The system of claim 1, wherein receiving from a first computing device, metadata includes receiving the metadata from a first type of protection process.

5. The system of claim 4, wherein receiving, from a second computing device, log activity data includes receiving the activity data from a second type of protection process.

6. A storage device comprising instructions, which when executed by a processing unit, configure the processing unit to perform operations comprising:
detecting execution of a malicious SQL command at an SQL server;
receiving metadata associated with the detected malicious SQL command, the metadata comprising:
the malicious SQL command,
a device identifier of a first computing device,
a process identifier associated with the malicious SQL command, and
a timestamp of the malicious SQL command execution;
receiving, from a second computing device, log activity data comprising:
a device identifier of the second computing device,
a process identifier and associated execution timestamp for a process executed on the second computing device, and
a user identifier associated with the process identifier;
matching the device identifier of the first computing device to the device identifier of the second computing device;
matching the process identifier and timestamp from the metadata with the process identifier and associated execution timestamp from the log activity data;
accessing the user identifier associated with the matched process identifier; and
transmitting an alert identifying the second computing device as a source of the malicious SQL command, and the accessed user identifier.

7. The storage device of claim 6, wherein the operation of matching the device identifier included in the metadata to a device identifier in the log activity data includes:
matching an internet protocol address of the second computing device to the internet protocol address included in the device identifier of the metadata.

8. The storage device of claim 7, wherein the instructions, which when executed by the processing unit, configure the processing unit to perform operations, further configure the processing unit to perform operations of:
identifying a process identifier in the log activity data;
matching a timestamp included in the metadata with an execution timestamp of the process; and
based on matching the timestamp, identifying the process identifier in the log activity data as a source of the suspected malicious SQL command.

9. The storage device of claim 8, wherein the instructions, which when executed by the processing unit, configure the processing unit to perform operations, further configure the processing unit to perform operations of:
accessing a user identifier associated with the process identifier in the log activity data; and
including the user identifier in the alert.

10. The storage device of claim 6, wherein receiving from a first computing device, metadata includes receiving the metadata from a first type of protection process.

11. The storage device of claim 10, wherein receiving, from a second computing device, log activity data includes receiving the activity data from a second type of protection process.

12. A method comprising:
detecting execution of a malicious SQL command at an SQL server;
receiving metadata associated with the detected malicious SQL command, the metadata comprising:
the malicious SQL command,
a device identifier of a first computing device,
a process identifier associated with the malicious SQL command, and
a timestamp of the malicious SQL command execution;
receiving, from a second computing device, log activity data comprising:
a device identifier of the second computing device,
a process identifier and associated execution timestamp for a process executed on the second computing device, and
a user identifier associated with the process identifier;
matching the device identifier of the first computing device to the device identifier of the second computing device;
matching the process identifier and timestamp from the metadata with the process identifier and associated execution timestamp from the log activity data;
accessing the user identifier associated with the matched process identifier; and
transmitting an alert identifying the second computing device as a source of the malicious SQL command, and the accessed user identifier.

13. The method of claim 12, wherein matching the device identifier included in the metadata to a device identifier in the log activity data includes:
matching an internet protocol address of the second computing device to the internet protocol address included in the device identifier of the metadata.

14. The method of claim 13, further comprising:
identifying a process identifier in the log activity data;
matching a timestamp included in the metadata with an execution timestamp of the process; and
based on matching the timestamp, identifying the process identifier in the log activity data as a source of the suspected malicious SQL command.

15. The method of claim 14, further comprising:
accessing a user identifier associated with the process identifier in the log activity data; and
including the user identifier in the alert.

16. The method of claim 12, wherein receiving from a first computing device, metadata includes receiving the metadata from a first type of protection process.

* * * * *